Sept. 8, 1959   H. B. FOSTER   2,902,739
METHODS OF CHANGING OR ALTERING THE COLOR OF BUILDING
BRICKS, TILE, OR OTHER CERAMIC UNITS
Filed July 19, 1957

```
┌─────────────────────────────────┐
│   UNFIRED BRICK OR TILE         │
│   FORMED FROM IRON-BEARING      │
│     RED - BURNING CLAY          │
└─────────────────────────────────┘
                │
                │
┌─────────────────────────────────┐
│  COATING A SELECTED SURFACE     │
│  OR SURFACES OF THE BRICK WITH  │
│  A METALLIC COMPOUND, OR WITH   │
│  A METALLIC COMPOUND AND A      │
│  SMALL QUANTITY OF A COLORANT   │
└─────────────────────────────────┘
                │
                │
         ┌─────────────┐
         │   DRYING    │
         └─────────────┘
                │
                │
         ┌─────────────┐
         │   FIRING    │
         └─────────────┘
                │
                │
         ┌─────────────────┐
         │  BRICK OR TILE  │
         │ OF DESIRED COLOR│
         └─────────────────┘
```

INVENTOR
HARLEY B. FOSTER

BY
ATTORNEY

United States Patent Office 2,902,739
Patented Sept. 8, 1959

2,902,739

METHODS OF CHANGING OR ALTERING THE COLOR OF BUILDING BRICKS, TILE, OR OTHER CERAMIC UNITS

Harley B. Foster, Greensboro, N.C.

Application July 19, 1957, Serial No. 672,856

2 Claims. (Cl. 25—156)

This invention relates to building brick, tile, and similar clay products, and more particularly, to a method of coloring such products by means of thermo-chemically changing selected outer surfaces.

The present application is a continuation-in-part of my application Serial No. 585,626, filed May 18, 1956, now abandoned for Methods of Changing or Altering the Color of Building Bricks, Tile, or Other Ceramic Units, wherein there is described and claimed improved methods of altering or changing the color of red-burning clay or shale building brick and tile from the color which said product would normally acquire from the ceramic heat treating processes customarily employed.

In accordance with one method of the aforesaid application, a thin coating of metal or metallic compound is applied to the surfaces of the brick to be colored by spraying, dipping, painting, rolling, or by other suitable means, and the brick or tile is then fired in the usual manner to the maturing temperature best suited to the particular material. The coating, in the form of a film, is applied to the surface clay or shale unit in the unburned state, and when the unit is fired, the metal or metallic compound of the coating fuses to, and becomes part of, the surface of the ceramic body in the form of a complex ceramic oxide, which is different in color from that of the ceramic body alone, that is to say, from the color of the untreated surfaces of the unit.

In another embodiment, described in said application, the color of the brick, tile, or ceramic unit is altered by the use of a metal in combination with one or more metallic oxides. In this method, the color oxide is mixed with a powdered metal in suspension by means of a suitable vehicle. The small metallic particles become intimately mixed with the grains of color oxide during the mixing process, and when applied to the surface of the brick, or other unit, and the unit is introduced into the kiln, as in the ordinary method of burning brick, some of the metal oxidizes so that the outer surface is a combination of color oxide and an oxide of the metal. Some of the metal in a thin layer underneath the outer oxide layer tends to remain in a condition more nearly approximating metal rather than an oxide thereof, particularly, as the layers approach the underlying clay body. Accordingly, the molten metal and hot clay surface are permanently joined or autogenously bonded, and the metal assists in providing a bond between the color oxide layer and the ceramic body of the brick.

The majority of clays and shales used in the production of brick and tile contain iron in sufficient quantity to control or determine the finished fired color of said brick and tile, usually in the red range associated with oxidized iron. In the case of "flashing," that is to say, by manipulating kiln atmospheres to vary the degree of oxidation of iron in the finished product, the color may be altered within certain limits from the basic red, usually toward black or dark shades associated with the reduced forms of iron oxides, but it is significant that iron is still the predominantly controlling factor in the finished color of the brick or tile. While there are numerous ceramic colorants, metallic oxides and ceramic stains prepared from such oxides or combinations thereof, which are used to produce desired color when used with relatively iron-free ceramic bodies, such as pottery or other whitewares, the only way such colorants have been employed with red-burning bodies such as ordinary brick and tile is by means of a superimposed coating which overlays and covers up the iron-bearing surface with a glaze, engobe or sand coating.

After considerable research and experimentation, I have found that certain metallic elements, when applied to the iron-bearing red-burning clays or shales, will combine chemically with the iron at high temperatures, that is, at the normal firing temperatures for producing brick and tile, to form a spinel or crystal of a color different from that of the normal red-burning body. I have also found that when other metals or metallic compounds with strong coloring powers are also present in varying amounts, during this crystalline formation, the crystals may be made to take on various colors, depending upon the selection and the proportions of the colorant or colorants. Accordingly, by spraying or otherwise coating a brick, tile, or similar clay product with a controlled mixture of such compounds prior to burning, it is possible to transform the surface color of the brick, tile or clay product from that of the red range to various other colors in the fired state. These new colors, being pyrochemically made an actual part of the clay product itself, are permanent and durable.

After examining and testing numerous specimens colored with a wide variety of materials, it was found that some of the colored coatings had a greater resistance to abrasion, better weathering characteristics, and other desirable properties such as resistance to freezing and thawing cycles. From further study and experimentation it was found that the basic difference between the specimens is due to the fact that some of the coatings were affixed to the clay unit by means of mechanical bond as opposed to a thermochemical change. Thus, it was found that certain materials, notably compounds of zinc, titanium and manganese, seemed to enter into a crystalline development, presumably of the ferrite family, resulting in an actual chemical change of the outer layer of the clay mass. These new crystals in themselves yield a surface layer coloring substantially different from the normal burned color of the clay itself; but it was also found that the color of the new crystals could be further modified by having present a small amount of a strong colorant which, if said colorant were to be used alone, would not enter into a chemical change as such with the clay body itself at ordinary firing temperatures. Thus, it is possible to produce a color change wherein the surface color is integrally compounded with the underlying base, taking advantage of the coloring power of materials which otherwise would only form a mechanical bond of sorts.

Aside from better performance, or greater durability, there is a distinct economic advantage to obtaining color through controlled crystalline development. Many of the metallic oxides used as ceramic colorants and the stains prepared from such oxides cost as much as ten times the relatively low cost pigment type of materials found best at crystalline development, yet the latter can be used in quantities up to 90% of the solid content of the color fluid to produce shades and tints in the same color family which an equivalent amount of the more expensive colorant alone would yield.

It is therefore, an object of the present invention to provide a novel method of coloring brick, tile, and similar clay products by means of thermo-chemically changing selected outer surfaces thereof.

Another object of my invention is to provide an improved method of altering the burned color of the otherwise red surface of a brick or tile by means of neutralizing the strong coloring power of the iron present in the surface layer through controlled crystal development, that is, by "marrying" the iron chemically in such manner as to destroy its natural tendency to control the finished fired color.

Yet another object of my invention is to provide an improved method of altering or changing the color of red-burning clay or shale building brick and tile.

A further object of my invention is to provide an improved method of altering or changing the color of clay or shale building brick and tile from the color which they would normally acquire from customary ceramic heat treating processes.

A still further object of my invention is to provide an improved method of coloring brick tile and similar iron-red burning clay products by applying a ceramic colorant thereto which will combine chemically with the iron at normal firing temperatures for producing the brick or tile, to form a spinel or crystal of color different from the normal red-burning body of the brick, tile, or other product.

Yet a further object of my invention is to provide an improved method of coloring building brick, tile, and similar clay products, by applying thereto a metallic compound in a suitable liquid vehicle, the selected compound having the property of chemically combining with the iron of the red-burning clay or shale from which the brick is formed, whereby the desired color is formed on the brick surfaces to which the coating is applied, when the brick is fired.

With these and other objects in view, the invention herein comprehends other features of novelty and advantage incident to my improved methods of coloring building brick and like ceramic units, without departing from the scope of the appended claims.

As an illustration of the practice of the method of the present invention, a fluid suspension consisting predominantly of zinc oxide, with manganese dioxide in small to medium amounts, suspended in water, oil, or any convenient fluid medium, when applied by roller, spray or other means to an unburned brick or tile made from normally red-burning clay or shale, will when dried and fired in the usual way, have colors ranging from off-white through various shades of gray, chocolate or brown, to black. Zinc oxide with controlled amounts of the oxide or other compounds of the following metals utilized as colorants will yield various tints or shades of the color indicated:

Copper: cream, ivory, buff
    Cobalt: blue
    Chrome: tan - green
    Nickel: silver - gray Similarly, zinc chromate with varying amounts of cobalt oxide will produce various shades of green. Titanium compounds in almost any form, but preferably the oxide, for reasons of economy, will produce: grays with manganese oxide; blues with cobalt oxide; and various colors with controlled amounts of other metals or metallic oxides employed as colorants. Compounds of zinc, titanium, or other metals which form spinels with otherwise red-burning clays or shales may be used with the many commercially available ceramic stains intended for coloring glazes, bodies, enamels, engobes or glasses, to produce a wide selection of colors on brick, tile or similar clay product.

All of the above noted mixtures may be applied with any of the various textures commonly used in manufacturing brick and tile, for example, smooth, wire-cut, brushed, scratched, sand-finish, rolled-back or matte-textured, and similar surface decoration obtained by mechanical deformation. For smooth brick or tile made by the extruded or stiff-mud method, the coloring mixture may be introduced in, or in lieu of, the die lubricant.

While the method of the present invention particularly applies to selected surface treatment, it is to be understood that the same chemical process may be used to alter the color of the complete body of the brick or tile by introducing similar combinations of materials in the mixing stage prior to forming of the ware. For example, a water suspension of zinc oxide or titanium oxide with various colorants may be substituted for the normal pugging water, resulting in coloring the complete brick or tile. This is obviously much more expensive than surface application alone, but conditions of usage may sometimes justify the additional expense of altering the complete body color.

The method herein of coloring brick, tile, or other clay products differs from other presently employed methods as follows:

(1) Since no glass-forming ingredients are used, it presents no problems of glaze fit, or adjusting to thermal expansion, associated with ceramic glazes. The present method is also generally cheaper than glazing, and utilizes the regular face brick textures instead of obliterating them, and of particular importance is the fact that no special setting is required to prevent sticking, as is necessary when firing glazed ware.

(2) Being an actual part, chemically and physically, of the burned clay surface itself, the coloring is free of the chief danger of engobes or similar superimposed surface coatings, namely, that of separting or parting through actions of freezing and thawing cycles. Also, the present method is not so limited in texture as engobe application.

(3) The present method gives control vastly superior to that of flashing, with or without flashing compounds, with far greater uniformity of finished product.

While reference hereinabove has been principally to the use of zinc and titanium to "neutralize" the coloring power of iron in normally red-burning clays and shales, several other materials have this property, including, compounds of barium, such as the oxides, titanates, fluorides, metaphosphates; copper oxides, carbonates, chlorides; manganese, especially the oxides; strontium oxides and carbonates; vanadium oxides; and calcium oxides and carbonates. The oxides of zinc and titanium currently offer the advantage of being economically available in very small particle size which makes for greater efficiency. Generally speaking, it does not matter what form the metallic element is in, since it is separated from the negative valence elements when it undergoes the thermal chemistry change in the kiln. Economy is the governing factor in selection of chemical form.

With reference to the colorants, practically any ceramic colorant will function once the iron is neutralized or "chemically married" in such manner as to obviate the strong tendency to burn red. For example, sources of cobalt, chromium, nickel, copper, selenium, vanadium, manganese, uranium, lead, tin, and commercial body or glaze stains made from such materials, may be used. Even iron compounds in controlled amounts can be used to produce colors different from the original or untreated color. However, it is to be noted that when surface coating with water suspensions, it is most efficient to use insoluble forms, such as oxides for instance, to prevent wasteful absorption by the clay body, and separation between colorant and "neutralizing" agent.

I claim:

1. A method of imparting a substantially permanent coloration to the surfaces of building bricks, tiles and other ceramic units formed from iron-bearing red-burning clays or shales, which comprises applying to a brick or other unit, before firing, a coating comprised of a liquid carrier vehicle, a metallic compound which neutralizes the coloring power of the iron by combining at high temperatures with the iron present in the surface layers of the brick to form crystals lighter in color than the normal red-burning clay from which the brick is formed, and a relatively small quantity of a colorant having the property of altering the color of the newly formed crystals in said surface layers of the brick by dispersion throughout the crystals, whereby to produce a desired color, and then firing the coated brick in accordance with customary firing procedures.

2. A method of imparting a substantially permanent coloration to the surfaces of building bricks, tiles and other ceramic units formed from iron-bearing red-burning clays and shales, which comprises applying to a brick or other unit, before firing, a coating comprised of a metallic compound which neutralizes the coloring power of the iron by combining at high temperatures with the iron present in the surfaces of the brick to form crystals lighter in color than the normal red-burning clay from which the brick is formed, and a relatively small quantity of a colorant having the property of altering the color of the newly formed crystals in said surface layers of the brick by dispersion throughout the crystals, whereby to produce a desired color, and then firing the brick under customary firing conditions.

References Cited in the file of this patent

UNITED STATES PATENTS

| | | |
|---|---|---|
| 151,387 | Hall | May 26, 1874 |
| 468,321 | Anderson | Feb. 9, 1892 |
| 1,859,723 | Straight | May 24, 1932 |
| 1,958,837 | Ramsay | May 15, 1934 |

FOREIGN PATENTS

| | | |
|---|---|---|
| 157,052 | Australia | June 15, 1954 |

OTHER REFERENCES

"The Complete Book of Pottery Making," by J. B. Kenny, 1949, page 194.

Searle: "An Encyclopedia of the Ceramic Industries," 1929, vol. 2, pages 396 and 435.